United States Patent
Rammel et al.

(10) Patent No.: US 12,420,363 B2
(45) Date of Patent: Sep. 23, 2025

(54) ALIGNMENT SPACER ASSEMBLIES FOR WELDING AND METHODS FOR USING SAME

(71) Applicant: CROWN EQUIPMENT CORPORATION, New Bremen, OH (US)

(72) Inventors: Jordan Aloys Rammel, St. Henry, OH (US); David Allen Letchworth, La Grange, NC (US)

(73) Assignee: CROWN EQUIPMENT CORPORATION, New Bremen, OH (US)

( * ) Notice: Subject to any disclaimer, the term of this patent is extended or adjusted under 35 U.S.C. 154(b) by 0 days.

(21) Appl. No.: 18/829,792

(22) Filed: Sep. 10, 2024

(65) Prior Publication Data

US 2025/0001534 A1    Jan. 2, 2025

Related U.S. Application Data

(62) Division of application No. 18/110,931, filed on Feb. 17, 2023, now Pat. No. 12,109,654, which is a
(Continued)

(51) Int. Cl.
    *B23K 37/00*    (2025.01)
    *B23K 37/04*    (2006.01)

(52) U.S. Cl.
    CPC ...... *B23K 37/0452* (2013.01); *B23K 37/0426* (2013.01)

(58) Field of Classification Search
    CPC ...... B23K 37/04–0538; B23K 37/0452; B23K 37/0426
    See application file for complete search history.

(56) References Cited

U.S. PATENT DOCUMENTS

| | | |
|---|---|---|
| 2,154,817 A | 4/1939 | Fisher |
| 2,853,590 A | 9/1958 | Zandel et al. |

(Continued)

FOREIGN PATENT DOCUMENTS

| | | |
|---|---|---|
| BR | 112018005300 B1 | 12/2021 |
| CN | 2594355 A1 | 5/2013 |

(Continued)

*Primary Examiner* — Kiley S Stoner
(74) *Attorney, Agent, or Firm* — Dinsmore & Shohl LLP

(57) ABSTRACT

A spacer assembly and method for using same to fix a first component to a second component are provided. The method includes positioning the first and second spacer segments between the first and second components, the first and second spacer segments each including an inner face, an opposite outer face, and an exterior surface extending along a longitudinal axis between the inner face and the outer face. The exterior surfaces of the first and second spacer segments are coaxially aligned and secured by a securing device such that the inner faces of the first and second spacer segments define supplementary non-perpendicular angles relative to the longitudinal axis and the outer faces of the first and second spacer segments are parallel to one another. The securing device and the first and second spacer segments are removed after the first component is mechanically coupled to the second component.

7 Claims, 7 Drawing Sheets

Related U.S. Application Data division of application No. 17/090,197, filed on Nov. 5, 2020, now Pat. No. 11,607,754.

(60) Provisional application No. 63/053,869, filed on Jul. 20, 2020.

(56) References Cited

U.S. PATENT DOCUMENTS

| | | |
|---|---|---|
| 3,032,870 A | 5/1962 | Rohrberg et al. |
| 3,703,762 A | 11/1972 | Lind |
| 4,290,545 A | 9/1981 | Whitney |
| 4,307,833 A | 12/1981 | Barnard |
| 4,505,420 A | 3/1985 | Wittenbach |
| 7,617,963 B1 | 11/2009 | Jensen |
| 7,722,305 B2 | 5/2010 | Faith et al. |
| 2003/0129025 A1 | 7/2003 | Donovan |
| 2009/0250539 A1 | 10/2009 | Stelk |
| 2017/0082227 A1 | 3/2017 | Wortmann et al. |

FOREIGN PATENT DOCUMENTS

| | | | | |
|---|---|---|---|---|
| CN | 103612059 A | | 3/2014 | |
| CN | 112207484 A | | 1/2021 | |
| CN | 112621066 A | | 4/2021 | |
| CN | 114406597 A | | 4/2022 | |
| CN | 116275853 A | * | 6/2023 | ........... B23K 37/053 |
| DE | 10319986 B3 | | 2/2005 | |
| JP | 01027188 A | | 1/1989 | |
| KR | 101523063 B1 | * | 5/2015 | ........... B23K 37/053 |
| KR | 2018051322 A | * | 5/2018 | |
| KR | 102225376 B1 | * | 3/2021 | ........... B23K 31/003 |
| KR | 102421367 B1 | * | 7/2022 | .............. B23K 9/29 |
| RU | 2189893 C2 | | 9/2002 | |
| WO | 2014152851 A2 | | 9/2014 | |

\* cited by examiner

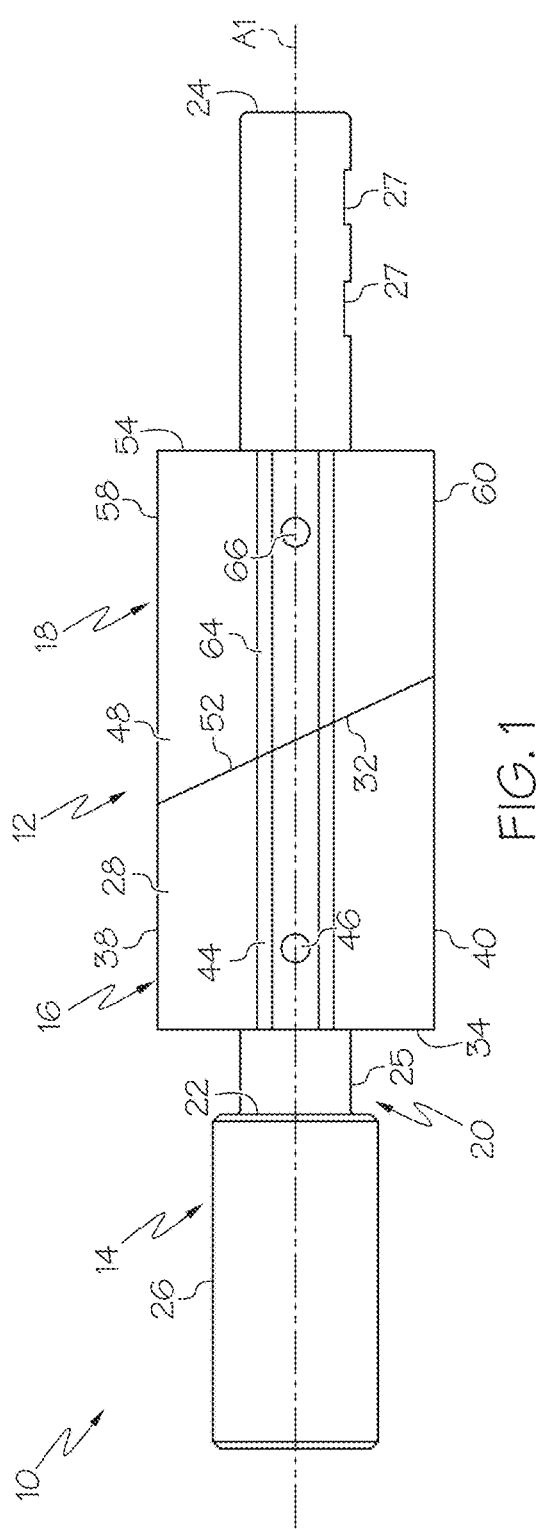
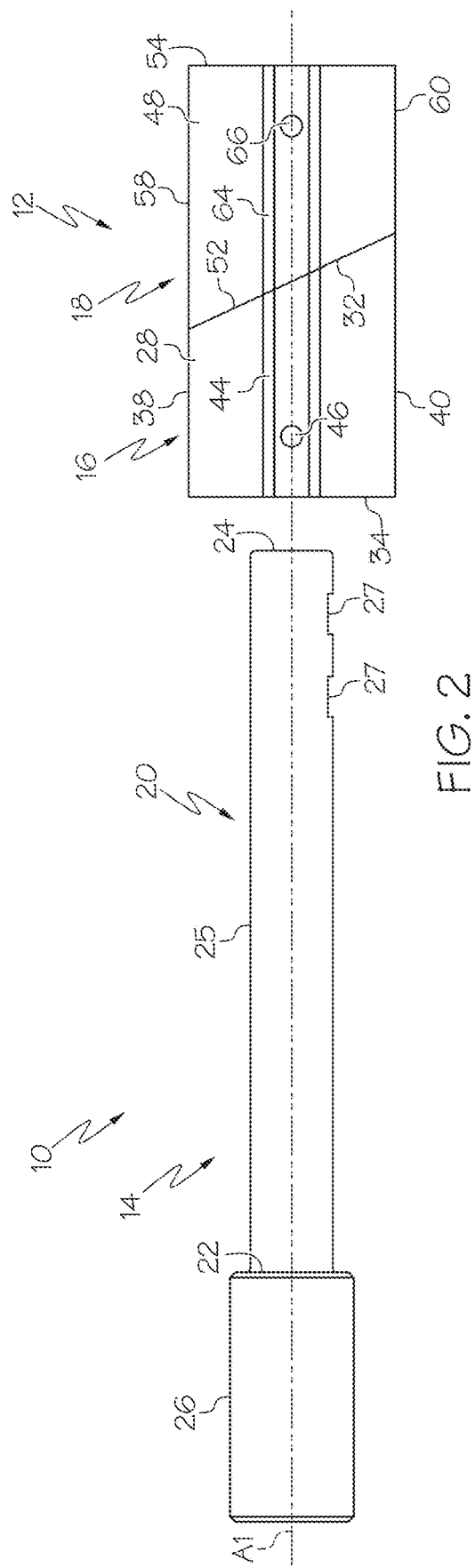

ALIGNMENT SPACER ASSEMBLIES FOR WELDING AND METHODS FOR USING SAME

CROSS-REFERENCE TO RELATED APPLICATIONS

This application is a divisional application of divisional application Ser. No. 18/110,931, filed Feb. 17, 2023, for "Alignment Spacer Assemblies For Welding And Methods For Using Same", which is a divisional application of U.S. Non-Provisional patent application Ser. No. 17/090,197, filed Nov. 5, 2020, now Issued U.S. Pat. No. 11,607,754, for "Alignment Spacer Assemblies For Welding And Methods For Using Same", which claims priority to U.S. Provisional Patent Application No. 63/053,869, filed Jul. 20, 2020, for "Alignment Spacer Assemblies For Welding," which are hereby incorporated by reference in their entirety including the drawings.

TECHNICAL FIELD

The present specification generally relates to spacing devices and methods for using same during welding operations and, more specifically, spacing devices and methods for positioning components at a fixed distance from one another during welding operations.

BACKGROUND

In traditional manufacturing settings, components are typically welded together and, subsequently, machined to add features during a downstream process after the components are welded. This method requires relatively expensive tooling and equipment to produce the final welded and machined part. Machining the components after welding is practical when working with smaller components, but difficult when the components are larger and require larger machinery to handle.

Accordingly, the present inventors have recognized a need for improved devices that allow for positioning machined components relative to one another during a welding operation.

SUMMARY

In one embodiment, a method for fixing a first component relative to a second component includes positioning a first spacer segment and a second spacer segment between the first component and the second component. The first spacer segment and the second spacer segment each include an inner face, an opposite outer face, and an alignment bore extending along a longitudinal axis from the inner face to the outer face, the inner face being oriented at an angle relative to the outer face. The alignment bore of the first spacer segment and the alignment bore of the second spacer segment is coaxially aligned with an aperture in the first component and an aperture in the second component such that the inner faces of the first and second spacer segments define supplementary non-perpendicular angles relative to the longitudinal axis of the alignment bore and the outer faces of the first and second spacer segments are parallel to one another. A securement pin is extended through the aperture of the first component, the alignment bore of the first spacer segment, the alignment bore of the second spacer segment, and the aperture of the second component. The first component is mechanically coupled to the second component. The securement pin, the first spacer segment, and the second spacer segment are removed from between the first component and the second component.

In another embodiment, a method for fixing a first component relative to a second component includes positioning a first spacer segment and a second spacer segment between the first component and the second component. The first spacer segment and the second spacer segment each include an inner face, an opposite outer face, and an exterior surface extending along a longitudinal axis between the inner face and the outer face, the inner face being oriented at an angle relative to the outer face. The exterior surfaces of the first spacer segment and the second spacer segment are coaxially aligned such that the inner faces of the first and second spacer segments define supplementary non-perpendicular angles relative to the longitudinal axis and the outer faces of the first and second spacer segments are parallel to one another. The first spacer segment and the second spacer segment are clamped between the first component and the second component. The first component is mechanically coupled to the second component. The first spacer segment and the second spacer segment are removed from between the first component and the second component.

In yet another embodiment, a method for fixing a first component relative to a second component includes positioning a first spacer segment and a second spacer segment between the first component and the second component. The first spacer segment and the second spacer segment each include an inner face, an opposite outer face, and an exterior surface extending along a longitudinal axis between the inner face and the outer face, the inner face being oriented at an angle relative to the outer face. The exterior surfaces of the first spacer segment and the second spacer segment are coaxially aligned such that the inner faces of the first and second spacer segments define supplementary non-perpendicular angles relative to the longitudinal axis and the outer faces of the first and second spacer segments are parallel to one another. A clamp is positioned relative to the first component and the second component to fix the first spacer segment relative to the second spacer segment. The first component is mechanically coupled to the second component. The clamp, the first spacer segment, and the second spacer segment are removed from between the first component and the second component.

In yet another embodiment, a spacer assembly includes a first spacer segment, a second spacer segment, and a securing device. The first spacer segment has an inner face, an opposite outer face, and an exterior surface extending between the inner face and the outer face along a longitudinal axis, the inner face being oriented at an angle relative to the outer face. The second spacer segment has an inner face, an opposite outer face, and an exterior surface extending between the inner face and the outer face along a longitudinal axis, the inner face being oriented at an angle relative to the outer face. The securing device is configured to fix the first spacer segment relative to the second spacer segment such that the exterior surface of the first spacer segment is coaxially aligned with the exterior surface of the second spacer segment. The inner face of the first spacer segment and the inner face of the second spacer segment define a supplementary non-perpendicular angle relative to the longitudinal axis the first spacer segment and the second spacer segment. The outer face of the first spacer segment is parallel to the outer face of the second spacer segment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 schematically depicts a front view of an embodiment of an alignment spacer assembly in an assembled state according to one or more embodiments shown and described herein;

FIG. 2 schematically depicts a front view of the alignment spacer assembly in a disassembled state according to one or more embodiments shown and described herein;

DETAILED DESCRIPTION

Figure 3:
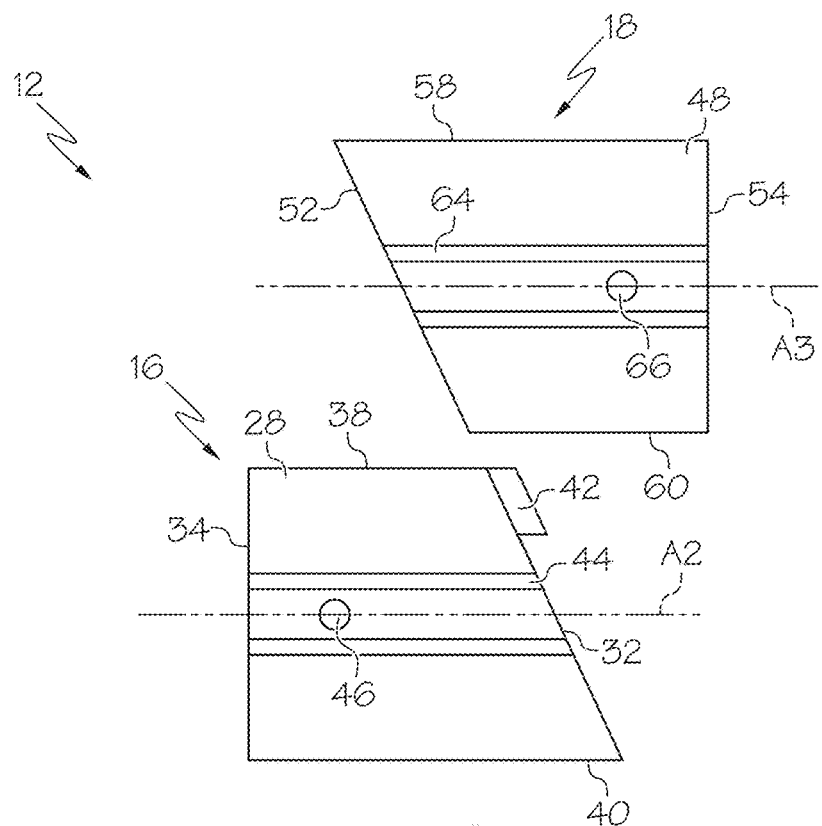
FIG. 3 schematically depicts a front view of a pair of spacer segments of the alignment spacer assembly in a misaligned state according to one or more embodiments shown and described herein.

Embodiments described herein are directed to an alignment spacer assembly for aligning at least a pair of spaced apart components during a welding operation. The alignment spacer assembly includes a spacer and a securing device such as a securement pin extendable through the spacer for positioning the components to be welded at a fixed distance apart from one another. The technology described herein is particularly well-suited for the manufacture of materials-handling vehicles including, for example, forklifts, turret stock pickers, aisle trucks, reach trucks, lift trucks, stackers, pallet jacks, tow tractors, and the like. Various embodiments of the alignment spacer assembly and the operation of the alignment spacer assembly are described in more detail herein. Whenever possible, the same reference numerals will be used throughout the drawings to refer to the same or like parts.

Referring now to FIG. 1, an alignment spacer assembly 10 is illustrated according to one or more embodiments described herein. The alignment spacer assembly 10 may generally include a spacer 12 and a securing device. In some embodiments, the securing device is a securement pin 14 axially extendable through the spacer 12. The spacer 12 includes a first spacer segment 16 and a second spacer segment 18 through which the securement pin 14 may extend. As shown in FIG. 1, the securement pin 14 and spacer assembly 10 is illustrated in an assembled state. In the assembled state, the spacer 12 is in an aligned state such that the first spacer segment 16 and the second spacer segment 18 abut against and are coaxial with one another. In addition, the securement pin 14 extends through each of the first spacer segment 16 and the second spacer segment 18 when in the assembled state.

As shown in FIG. 2, the alignment spacer assembly 10 is in a disassembled state in which the securement pin 14 does not extend through each of the first spacer segment 16 and the second spacer segment 18. However, the spacer 12 is shown in the aligned state with the first spacer segment 16 and the second spacer segment 18 abutting against and coaxial with one another.

As shown in FIGS. 1 and 2, the securement pin 14 includes a shaft 20 having a first end 22 and a second end 24. The shaft 20 has an exterior surface 25 extending along a longitudinal axis A1 between the first end 22 and the second end 24. In some embodiments, the exterior surface 25 of the shaft 20 is cylindrical and has a constant diameter. However, the exterior surface 25 of the shaft 20 may have any suitable geometry such as, for example, rectangular or the like. A stopper 26 is provided at the first end 22 of the shaft 20. The stopper 26 has a diameter greater than a diameter of the shaft 20 for restricting movement of the securement pin 14 relative to the spacer 12 during a welding operation, as discussed in more detail herein. To further restrict movement of the securement pin 14 during a welding operation, the securement pin 14 may include at least one locking member, not shown, provided on or proximate the second end 24 of the shaft 20. In some embodiments, the shaft 20 includes at least one aperture 27 extending transverse to the longitudinal axis A1 of the shaft 20 for receiving the locking member such as, for example, a ball detent pin. The securement pin 14 may be formed from any suitable material such as steel. As non-limiting examples, the securement pin 14 may be formed DH2F or PX5 sold by Titus Steel.

Figure 4:
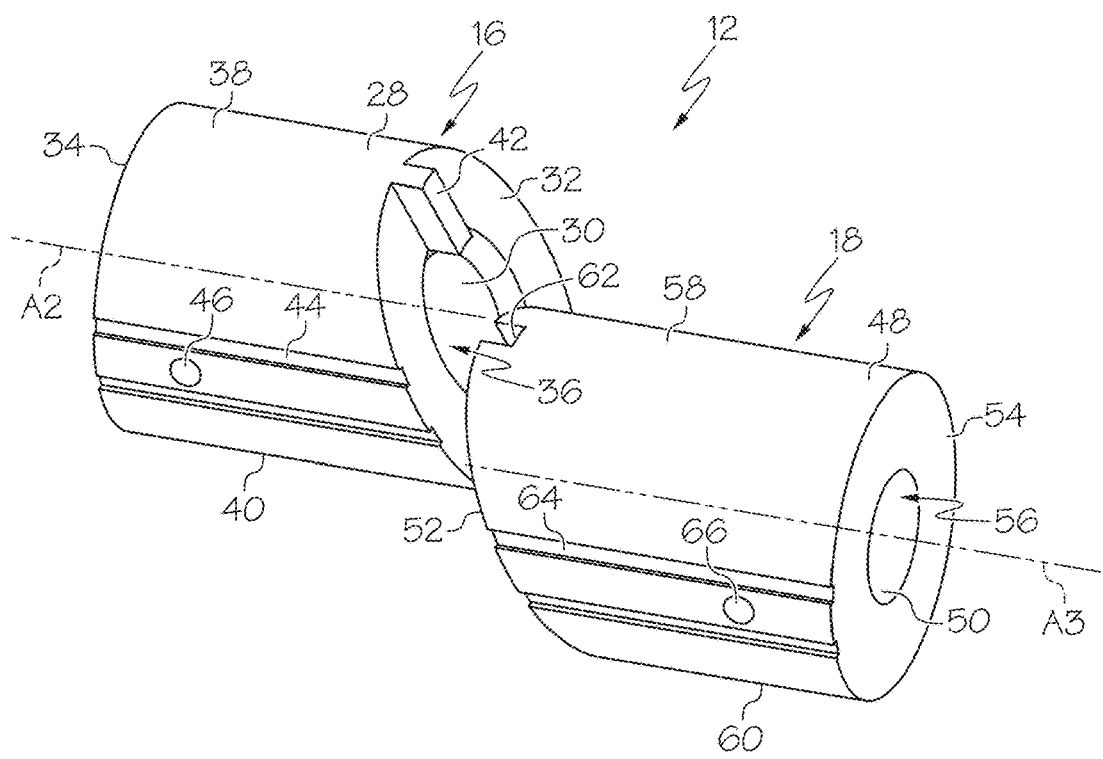
FIG. 4 schematically depicts an isometric view of the pair of spacer segments in the misaligned state according to one or more embodiments shown and described.

Referring now to FIGS. 3 and 4, the spacer 12 is shown in the misaligned state apart and separate from the securement pin 14. As noted above, the spacer 12 includes the first spacer segment 16 and the second spacer segment 18. The first spacer segment 16 has an exterior surface 28. In some embodiments, the exterior surface 28 is cylindrical. However, the exterior surface 28 of the first spacer segment 16 may have any suitable geometry such as, for example, rectangular or the like. The first spacer segment 16 has an interior surface 30 extending from an inner face 32 toward an opposite outer face 34 defining an alignment bore 36 extending along a longitudinal axis A2 between the inner face 32 and the outer face 34. In some embodiments, the interior surface 30 is cylindrical. Thus, the alignment bore 36 has a circular cross-section. However, the interior surface 30 of the first spacer segment 16 may have any suitable geometry such as, for example, rectangular or the like. The diameter and/or geometry of the alignment bore 36 is substantially similar to the diameter and/or geometry of the exterior surface 25 of the shaft 20 of the securement pin 14 such that the shaft 20 extends through the alignment bore 36 of the first spacer segment 16. The outer face 34 of the first spacer segment 16 is transverse to the longitudinal axis A2 extending through the alignment bore 36. The inner face 32 of the first spacer segment 16 is oriented at an angle relative to the inner face 32 of the first spacer segment 16 such that the inner face 32 and the outer face 34 do not extend parallel to one another. More particularly, the inner face 32 of the first spacer segment 16 defines a supplementary non-perpendicular angle relative to the longitudinal axis A2 of the alignment bore 36. As such, a distance between the inner face 32 and the outer face 34 at a top portion 38 of the first spacer segment is less than a distance between the inner face 32 and the outer face 34 at an opposite bottom portion 40 of the first spacer segment 16.

In some embodiments, the first spacer segment 16 includes a key 42 for engaging the second spacer segment 18, as discussed in more detail herein. As shown, the key 42 is provided on the inner face 32 of the first spacer segment 16 and extends opposite the outer face 34. In some embodiments, the key 42 is provided proximate the top portion 38 of the first spacer segment 16 and extends between the interior surface 30 and the exterior surface 28 thereof. However, the key 42 may be located at any other suitable location of the first spacer segment 16 such as, for example, proximate the bottom portion 40 of the first spacer segment 16 or on the exterior surface 28 thereof and may have any suitable shape and/or size. In some embodiments, the first spacer segment 16 has an alignment indicator 44 provided on the exterior surface 28 thereof. In embodiments, the alignment indicator 44 may be either a protrusion extending from or a groove formed within the exterior surface 28 of the first spacer segment 16. The alignment indicator 44 allows for easily verifying that the first spacer segment 16 is linearly aligned with the second spacer segment 18, as discussed herein. As shown, in some embodiments, the first spacer segment 16 has an aperture 46 formed in the exterior surface 28 thereof to provide a reference for the inner face 32 during a machining process.

The second spacer segment 18 is substantially similar in structure to the first spacer segment 16. As such, the second spacer segment 18 has an exterior surface 48. In some embodiments, the exterior surface 48 is cylindrical. However, the exterior surface 48 of the second spacer segment 18 may have any suitable geometry such as, for example, rectangular or the like. The second spacer segment 18 also has an interior surface 50 extending from an inner face 52 toward an opposite outer face 54 defining an alignment bore 56 extending along a longitudinal axis A3 between the inner face 32 and the outer face 34. In some embodiments, the interior surface 50 is cylindrical. Thus, the alignment bore 56 has a circular cross-section. However, the interior surface 50 of the second spacer segment 18 may have any suitable geometry such as, for example, rectangular or the like. The diameter and/or geometry of the alignment bore 56 is substantially similar to the diameter and/or geometry of the exterior surface 25 of the shaft 20 of the securement pin 14 such that the shaft 20 extends through the alignment bore 56 of the second spacer segment 18. Accordingly, the diameter of the alignment bore 56 of the second spacer segment 18 is equal to the diameter of the alignment bore 36 of the first spacer segment 16. The outer face 54 of the second spacer segment 18 is transverse to the longitudinal axis A3 extending through the alignment bore 56. The inner face 52 of the second spacer segment 18 is oriented at an angle relative to the inner face 52 of the second spacer segment 18 such that the inner face 52 and the outer face 54 do not extend parallel to one another. More particularly, the inner face 52 of the second spacer segment 18 defines a supplementary non-perpendicular angle relative to the longitudinal axis A3 of the alignment bore 56. As such, a distance between the inner face 52 and the outer face 54 at a top portion 58 of the first spacer segment 16 is greater than a distance between the inner face 52 and the outer face 54 at an opposite bottom portion 60 of the second spacer segment 18.

In some embodiments, the second spacer segment 18 includes a recess 62 for receiving the key 42 of the first spacer segment 16, as discussed herein. As shown, the recess 62 is provided on the inner face 52 of the second spacer segment 18 and extends toward the outer face 54. In some embodiments, the recess 62 is provided proximate the top portion 58 of the second spacer segment 18 and extends between the interior surface 50 and the exterior surface 48 thereof. However, the recess 62 may be located at any other suitable location of the second spacer segment 18 such as, for example, proximate the bottom portion 60 of the second spacer segment 18 or on the exterior surface 48 thereof and may have any suitable shape and/or size. It should be appreciated that, when the first spacer segment 16 and the second spacer segment 18 are moved toward one another and into the aligned state, the key 42 of the first spacer segment 16 extends within the recess 62 of the second spacer segment 18 to allow for the inner face 32 of the first spacer segment 16 and the inner face 52 of the second spacer segment 18 to contact one another in a flush manner. When in the aligned state, the alignment bore 36 of the first spacer segment 16 and the alignment bore 56 of the second spacer segment 18 are coaxial with one another to allow for the shaft 20 of the securement pin 14 to extend therethrough. Further, when in the aligned state, the outer face 34 of the first spacer segment 16 and the outer face 54 of the second spacer segment 18 are parallel to one another.

In some embodiments, the second spacer segment 18 has an alignment indicator 64 provided on the exterior surface 48 thereof. In embodiments, the alignment indicator 64 may be either a protrusion extending from or a groove formed within the exterior surface 48 of the second spacer segment 18. Thus, it can be visually verified that the spacer 12 is in the aligned state when the alignment indicator 44 of the first spacer segment 16 appears to be aligned with the alignment indicator 64 of the second spacer segment 18. As shown, in some embodiments, the second spacer segment 18 has an aperture 66 formed in the exterior surface 48 thereof to provide a reference for the inner face 52 during a machining process.

Figure 5:
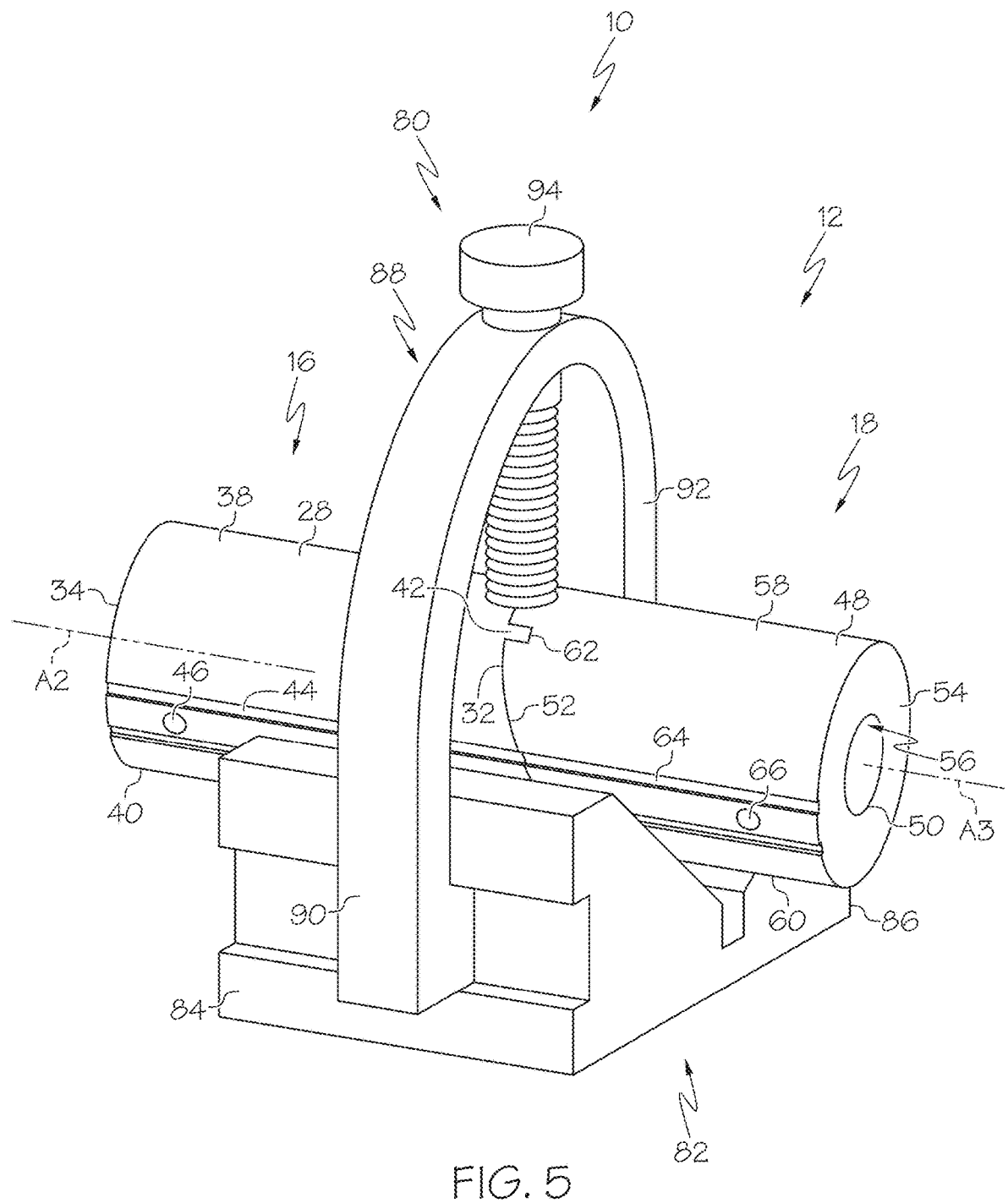
FIG. 5 schematically depicts an isometric view of an embodiment alignment spacer assembly according to one or more embodiments shown and described.

In some embodiments, it should be appreciated that the first spacer segment 16 and the second spacer segment 18 may be secured to one another in an abutting manner and coaxial to one another without the use of the securement pin 14 as described herein. As shown in FIG. 5, in some embodiments, the securing device is a clamp 80. As illustrated herein, the clamp 80 is depicted as a V-block clamp. However, the clamp 80 is not limited to this specific style of clamp. As such, the clamp 80 may be any suitable clamping device such as, for example, a G-clamp (C-clamp), a hand screw clamp, a sash clamp, a pipe clamp, a web clamp, a quick action/grip clamp, a compression ring, or the like. It should be appreciated that, in this embodiment, the first spacer segment 16 and the second spacer segment 18 do not need to include the alignment bores 36, 56.

As shown herein, the clamp 80 includes a body 82 having a first angular side wall 84 and a second angular side wall 86 having internal surfaces extending in a generally V-shape. The clamp 80 also includes a U-shaped bracket 88 having a first arm 90, a second arm 92, and an adjustable screw member 94 extending through the U-shaped bracket 88 toward the body 82. The first arm 90 and the second arm 92 slidably engage a groove formed on outer surfaces of the first angular side wall 84 and the second angular side wall 86, respectively. The adjustable screw member 94 threadedly engages the U-shaped bracket 88 such that rotation of the adjustable screw member 94 in a first direction causes an end of the adjustable screw member 94 to contact the first spacer segment 16 and the second spacer segment 18. Alternatively, rotation of the adjustable screw member 94 in an opposite second direction causes an end of the adjustable screw member 94 to move away from the first spacer segment 16 and the second spacer segment 18. As the adjustable screw member 94 is moved to contact the spacer 12, the first spacer segment 16 and the second spacer segment 18 are secured in position relative to one another in an abutting and coaxially aligned manner between the adjustable screw member 94 and the body 82 of the clamp 80, particularly the first angular side wall 84 and the second angular side wall 86.

In some embodiments, the securing device is a locking member such as, for example, a latch, hook or the like. The locking member is securable to mating loops or attachment points on the exterior surface 28 of the first spacer segment 16 and the exterior surface 48 of the second spacer segment 18 for securing the spacer assembly 10 in the aligned state.

Figure 6:
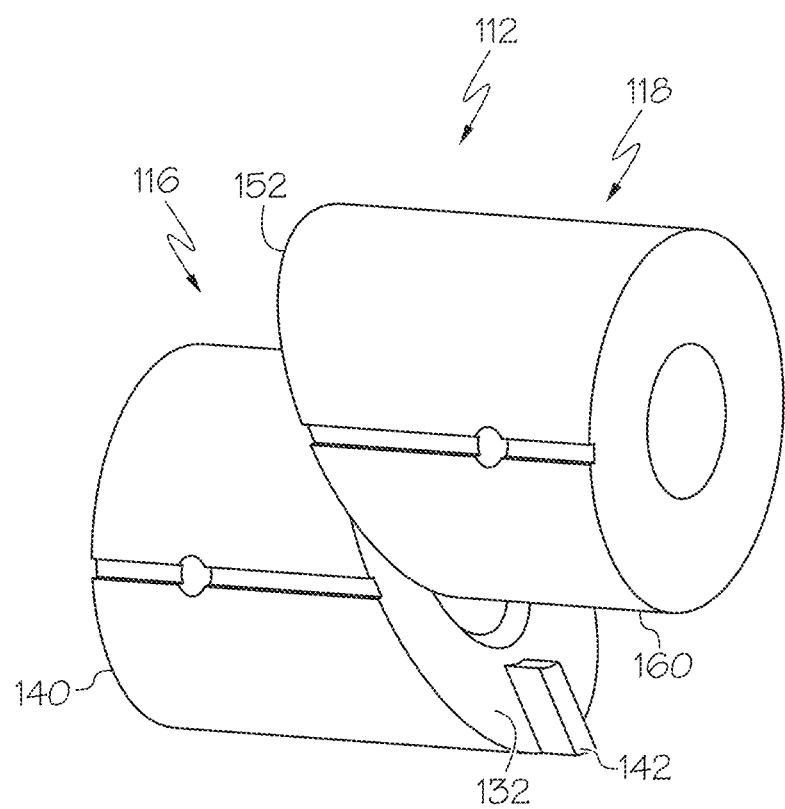
FIG. 6 schematically depicts an isometric view of an embodiment of a pair of spacer segments in a misaligned state according to one or more embodiments shown and described.

It should be appreciated that the length of the spacer 12 may be any suitable length by manufacturing the first spacer segment 16 and the second spacer segment 18 to have any suitable length such as, for example, 1 inch, 2 inches, 3 inches, 4 inches, 5 inches, 6 inches, 7 inches, 8 inches, 9 inches, or 10 inches. Thus, to avoid inadvertent mixing of individual spacer segments having different lengths, the location of the key 42 and the recess 62 may be moved. Referring now to FIG. 6, an alternative embodiment of a spacer 112 is illustrated including a first spacer segment 116 and a second spacer segment 118. Here, the first spacer segment 116 includes a key 142 extending outwardly from an inner face 132 proximate a bottom portion 140 thereof. As such, although not shown, the second spacer segment 118 has a recess, not shown, extending inwardly from an inner face 152 proximate a bottom portion 160 thereof. By moving the location of the key 142 and the recess, mismatching individual spacer segments, such as the first spacer segment 16 with the second spacer segment 118, or the first spacer segment 116 with the second spacer segment 18, is prevented.

Figure 7:
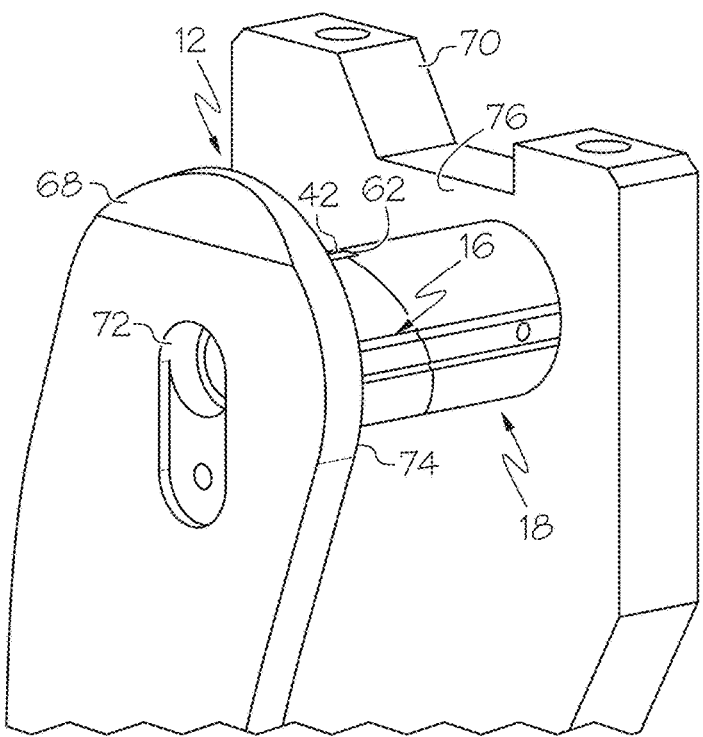
FIG. 7 schematically depicts an isometric view of a pair of components spaced apart by the pair of spacer segments of FIG. 3 in an aligned state according to one or more embodiments shown and described.
Figure 8:
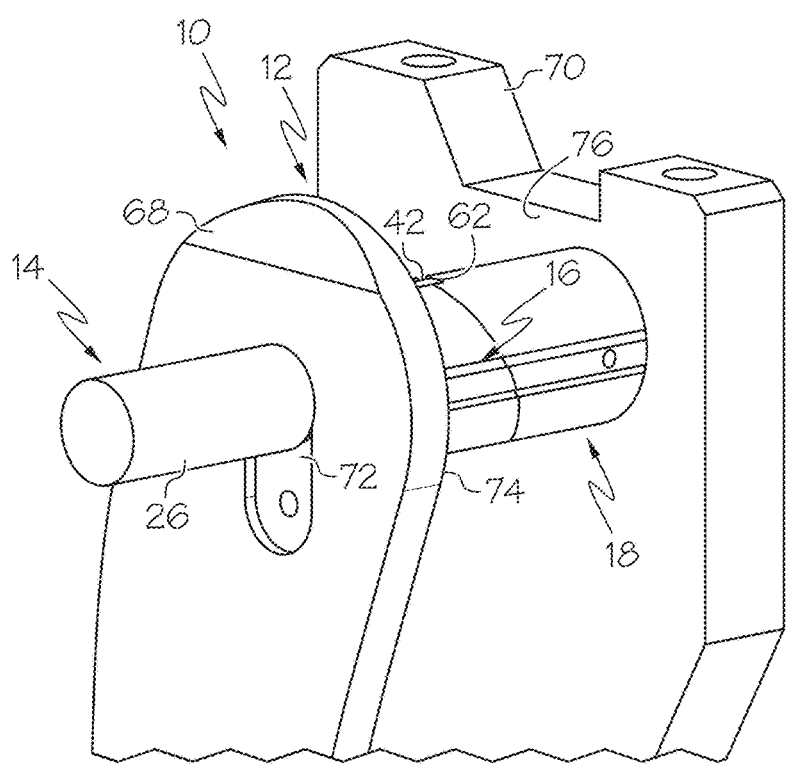
FIG. 8 schematically depicts an isometric view of the pair of components with the alignment spacer assembly in the assembled state according to one or more embodiments shown and described.
Figure 9:
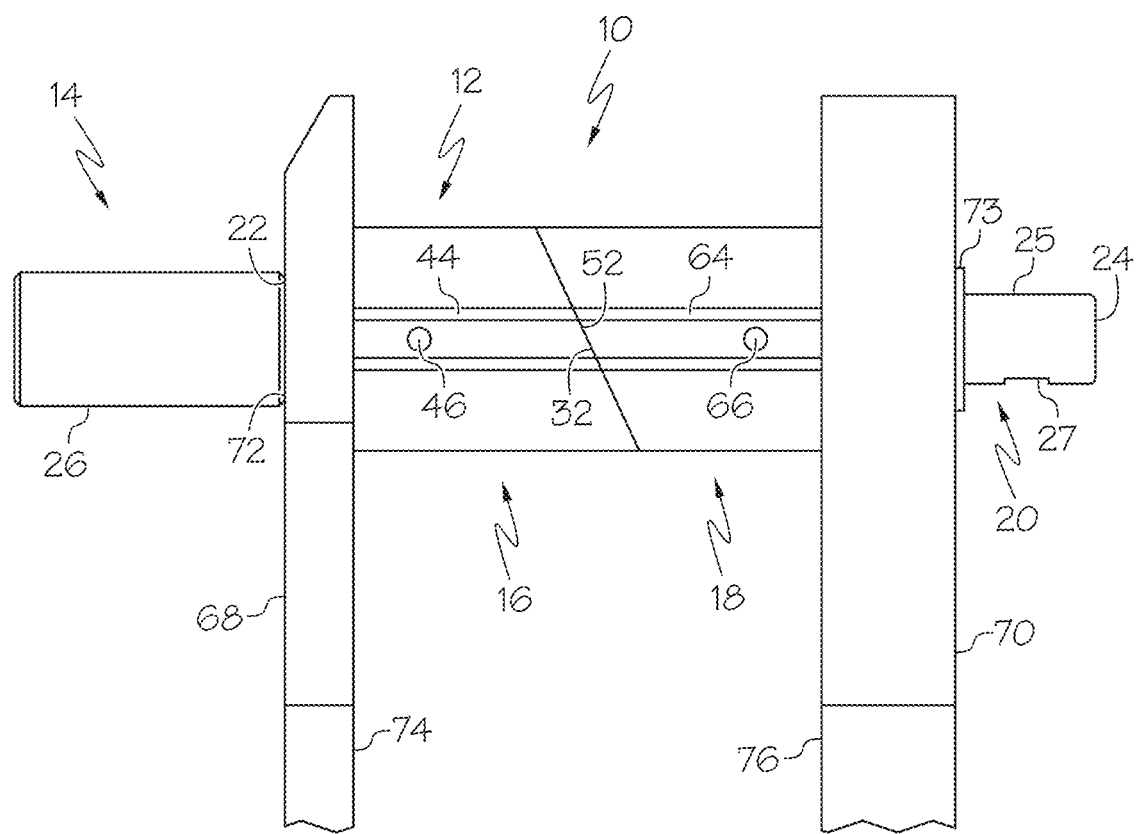
FIG. 9 schematically depicts a front view of the pair of components with the alignment spacer assembly in the assembled state according to one or more embodiments shown and described.
Figure 10:
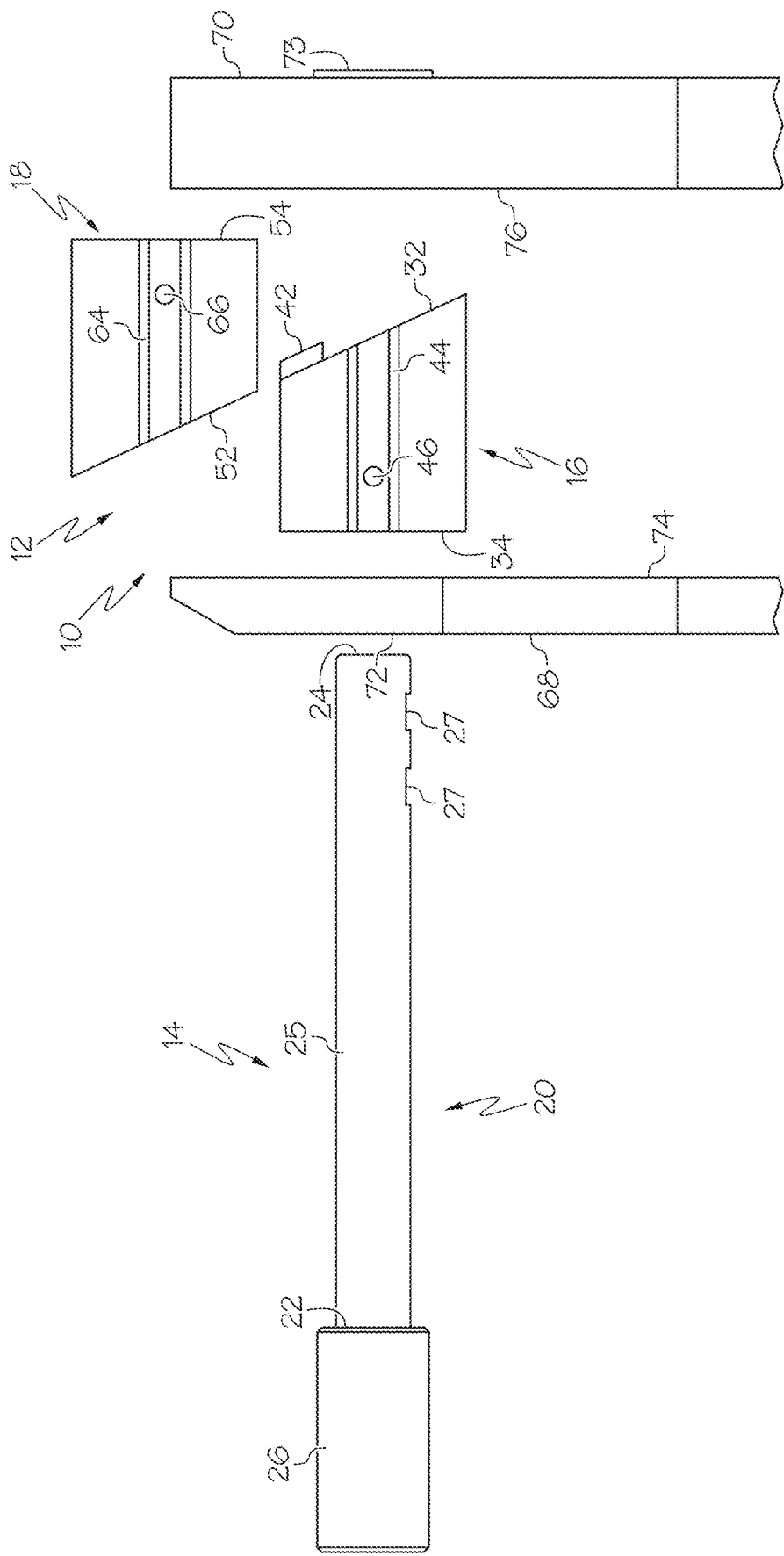
FIG. 10 schematically depicts a front view of the pair of components with the alignment spacer assembly in the disassembled state according to one or more embodiments shown and described.

A method of using the alignment spacer assembly 10 during a welding operation is now described in more detail. Referring now to FIGS. 7-9, a first component 68 is shown positioned adjacent to a second component 70 in which the first component 68 is welded in some manner to maintain a specified distance between the first component 68 and the second component 70. As shown, in some embodiments, the first component 68 has an aperture 72 formed therein and the second component 70 has an aperture 73 formed therein. It is intended to utilize the alignment spacer assembly 10 to weld the first component 68 and the second component 70 to one another, or to some other adjacent component, such that the apertures 72, 73 formed therein are coaxial with one another to receive a common axle or some other suitable part after welding and removing the spacer 12 from between the first component 68 and the second component 70. Initially, the spacer 12 is in the aligned state and positioned between an inner surface 74 of the first component 68 and an inner surface 76 of the second component 70. Specifically, the alignment bore 36 of the first spacer segment 16 aligns with the aperture 72 in the first component 68, and the alignment bore 56 of the second spacer segment 18 aligns with the aperture 73 in the second component 70, each of which are coaxial with one another. Further, the outer face 34 of the first spacer segment 16 contacts the inner surface 74 of the first component 68, and the outer face 54 of the second spacer segment 18 contacts the inner surface 76 of the second component 70.

Thereafter, in the embodiment in which the alignment spacer assembly 10 includes the securement pin 14, the securement pin 14 is extended through the aperture 72 formed in the first component 68, the alignment bore 36 of the first spacer segment 16, the alignment bore 56 of the second spacer segment 18, and the aperture 73 formed in the second component 70. The shaft 20 of the securement pin 14 is extended until a point at which the stopper 26 at the first end 22 of the shaft 20 contacts the first component 68 and prevents further extension of the securement pin 14. As described herein, a locking member, such as the ball detent pin, may then be inserted into the aperture 27 formed near the second end 24 of the shaft 20.

The spacer 12 being provided between the first component 68 and the second component 70, in addition to the stopper 26 at the first end 22 of the shaft 20 and the locking member proximate the second end 24 of the shaft 20, maintain a fixed distance between the first component 68 and the second component 70 during the welding operation. Thus, the first component 68 and the second component 70 may be welded to one another, or to some other component, while the distance between the first component 68 and the second component 70 is maintained. While the first component 68 may be welded directly to the second component 70, it should be appreciated that the first component 68 and the second component 70 may each include a multi-part component. For example, the first component 68 may include a first part including the aperture 72, and a second part coupled to the first part. Similarly, the second component 70 may include a first part including the aperture 73, and a second part coupled to the first part. Here, the second part of the first component 68 may be welded to the second part of the second component 70.

Referring now to FIG. 9, the alignment spacer assembly 10 is shown being moved from the assembled state toward the disassembled state and removed from the first component 68 and the second component 70 after a welding operation by, first, removing the securement pin 14 from the spacer 12. The first spacer segment 16 and the second spacer segment 18 are then permitted to move toward the misaligned state and separate from one another. More particularly, the first spacer segment 16 and the second spacer segment 18 are removed by moving the first spacer segment 16 in a first direction and the second spacer segment 18 in a second direction different than the first direction. In embodiments, the first direction is parallel to the outer face 34 of the first spacer segment 16 and the second direction is parallel to the outer face 54 of the second spacer segment 18.

As discussed above, it is appreciated that the spacer 12 may be secured in the aligned state using the clamp 80 instead of the securement pin 14. As such, the first component 68 and the second component 70 does not need to include the apertures 72, 73, respectively. Instead, the clamp 80 is utilized for securing the first spacer segment 16 and the second spacer segment 18 to one another between the first component 68 and the second component 70.

From the above, it is to be appreciated that defined herein is an alignment spacer assembly for fixing at least a pair of components to one another at a fixed distance apart during a welding operation.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A spacer assembly comprising:
   a first spacer segment having an inner face, an opposite outer face, and an exterior surface extending between the inner face and the outer face along a longitudinal axis, the inner face being oriented at an angle relative to the outer face;
   a second spacer segment having an inner face, an opposite outer face, and an exterior surface extending between the inner face and the outer face along a longitudinal axis, the inner face being oriented at an angle relative to the outer face; and
   a securing device configured to fix the first spacer segment relative to the second spacer segment such that the exterior surface of the first spacer segment is coaxially aligned with the exterior surface of the second spacer segment, wherein:
   the inner face of the first spacer segment and the inner face of the second spacer segment define a supplementary non-perpendicular angle relative to the longitudinal axis the first spacer segment and the second spacer segment,
   the outer face of the first spacer segment is parallel to the outer face of the second spacer segment.

2. The spacer assembly of claim 1, wherein the securing device is a securement pin extending through an alignment bore of the first spacer segment and an alignment bore of the second spacer segment.

3. The spacer assembly of claim 2, wherein the alignment bore of the first spacer segment and the alignment bore of the second spacer segment define circular cross-sections of equal dimensions.

4. The spacer assembly of claim 1, wherein the securing device is a V-block clamp configured to maintain coaxial alignment of the first spacer segment and the second spacer segment.

5. The spacer assembly of claim 1, wherein:
   an inner surface of the first component is oriented parallel to and faces an inner surface of the second component;
   the outer face of the first spacer segment contacts the inner surface of the first component; and
   the outer face of the second spacer segment contacts the inner surface of the second component.

6. The spacer assembly of claim 1, further comprising a key extending from the inner face of the first spacer segment and positionable into a recess formed in the inner face of the second spacer segment.

7. The spacer assembly of claim 1, wherein the angle between the inner face and the outer face of the first spacer segment and the angle between the inner face and the outer face of the second spacer segment are the same, the angles being between 30 degrees and 60 degrees.

* * * * *